United States Patent [19]

Crimmins et al.

[11] Patent Number: 4,644,585

[45] Date of Patent: Feb. 17, 1987

[54] METHOD AND APPARATUS FOR AUTOMATIC SHAPE RECOGNITION

[75] Inventors: Thomas R. Crimmins; William M. Brown, both of Ann Arbor, Mich.

[73] Assignee: Environmental Research Institute of Michigan, Ann Arbor, Mich.

[21] Appl. No.: 700,050

[22] Filed: Feb. 11, 1985

[51] Int. Cl.$^4$ .............................................. G06H 9/20
[52] U.S. Cl. ...................................... 382/48; 358/106; 382/41; 382/49
[58] Field of Search .................... 382/41, 48, 49, 10, 382/23, 30, 58; 356/237; 358/106

[56] References Cited

U.S. PATENT DOCUMENTS

| | | | |
|---|---|---|---|
| 3,761,876 | 9/1973 | Flaherty et al. | 382/48 |
| 4,414,685 | 11/1983 | Sternberg | 382/49 |
| 4,477,926 | 10/1984 | Linger et al. | 382/49 |
| 4,479,242 | 10/1984 | Kurata | 382/58 |

*Primary Examiner*—Leo H. Boudreau
*Assistant Examiner*—Joseph Mancuso
*Attorney, Agent, or Firm*—Krass & Young

[57] ABSTRACT

A method and apparatus are disclosed for determining whether a shape or pattern exists anywhere in a particular image represented by a matrix of digital data signals. In the preferred embodiment, a suitably programmed general purpose computer provides means for storing the matrix of data signals representing the first image, computing the complement of the first image matrix and storing the complement image matrix, creating a structuring element representative of the target shape to be recognized and storing a matrix of digital data signals representing that structuring element, and creating a second structuring element equal to the window complement of the first structuring element and storing the second structuring element. One or more substantially identical neighborhood transformation stages are then employed for electronically eroding the first image with the first structuring element to form a first transformation matrix, and electronically eroding the complement image matrix with the second structuring element to form a second transformation matrix. The corresponding points of the first and second transformation matrices are then combined to form a result matrix wherein each non-zero point represents the location of the desired shape or pattern in the first image.

5 Claims, 4 Drawing Figures

METHOD AND APPARATUS FOR AUTOMATIC SHAPE RECOGNITION

FIELD OF THE INVENTION

This invention relates to pattern recognition and analysis methods and devices and, more particularly, to a method and apparatus for automatically detecting the presence of a selected shape or pattern in a particular image.

BACKGROUND OF THE INVENTION

There are many applications in which it would be desirable to employ a machine to automatically recognize shapes or patterns existing in images which have been sensed and converted into some sort of matrix of electrical signals. Relatively specialized systems have been developed which employ particular algorithms, with at least limited success, to detect simple classes of shapes or patterns such as alphanumeric characters. (See, e.g. U.S. Pat. Nos. 3,846,754 to Oka; 3,196,398 to Baskin; 3,573,789 to Sharp; 3,761,876 to Flarety; 3,287,703 to Slotnick; and 3,899,771 to Saroga et al.) However, the extension of machine vision to industrial or military operations requiring the detection of a more general class of shapes and/or patterns has met with limited results.

Elaborate programs have been written for general purpose computers to perform pattern analysis and classification. These systems have met with limited success due to the extremely long processing times associated with processing images having a large number of data points on a general purpose computer.

In order to greatly reduce processing time, a number of high speed, special purpose image processing machines have been developed. For example, U.S. Pat. No. 4,445,137, issued to Panofsky, discloses an image data processing system comprising a multi-stage digital delay circuit for modifying a serial stream of image data in accordance with a pre-selected algorithm. The Panofsky system utilizes a series of masks which may be logically combined on a bit by bit basis with the image stream to determine the degrees of correspondence between a known standard part geometry and the test parts being inspected by the system. It should be noted, however, that this system requires that the test parts appearing in the image frame be in the exact position of the standard object in the mask frame in order for the correspondence results to be valid.

Accordingly, it is an object of the present invention to provide a method and apparatus for automatic shape recognition which is generally applicable to any shapes and/or patterns.

It is another object of this invention to provide a method for recognizing and detecting the existance of predetermined shape at any location within a particular image frame.

It is a further object of the present invention to provide a method and apparatus for automatic shape and/or pattern detection which utilizes basic set theory operations and the image algebra operation of erosion to determine whether the particular shape and/or pattern is present in a binary or gray scale image.

SUMMARY OF THE INVENTION

The present invention provides a generalized method for determining whether a shape or pattern exists anywhere in a particular image frame. This method, based upon basic set theory and image algebra, treats images and shapes as point sets in n-dimensional cartesion space. The problem of shape or pattern recognition is thus converted to the problem of detecting the occurrences of specific subsets of points within an a larger set (the image). As will be shown, this problem may be solved for any shapes by utilizing the simple set operations of union, intersection, complement and reflection, and the image algebra operations of dilation and erosion.

According to one aspect of the present invention, a machine implementable method is provided for detecting the existence of one or more preselected shapes and/or patterns in a first image represented by a matrix of digital data signals including the steps of (a) computing the complement of the first image matrix; (b) creating a first structuring element, representative of the shape to be recognized, as a matrix of digital data signals slightly larger in dimension than the shape; (c) creating a second structuring element equal to the window complement of the first structuring element; (d) eroding the first image matrix with the first structuring element to form a first transformation matrix; (e) eroding the complement image matrix with the second structuring element to form a second transformation matrix; and (g) combining the corresponding points of the first and second transformation matrices to form a result matrix wherein each non-zero point identifies an origin point where the shape has been recognized in the first image matrix.

The above-described method is preferably implemented on a special purpose computer comprising one or more substantially identical, programmable neighborhood transformation stages which operate on a serial stream of digital electrical signals corresponding to a matrix of points in the image as the serial stream is passed through the stage. A detailed disclosure of this apparatus, known as the "Cytocomputer", is disclosed in U.S. Pat. No. 4,414,685, issued to Sternberg and assigned to the Environmental Research Institute of Michigan, the assignee of the present invention. In the Cytocomputer, small structuring elements contained within a 3×3 matrix are utilized in the erosion operations. A structuring element corresponding to a particular target shape larger than 3×3 is created by performing a series of dilation steps upon one or more selected small structuring elements until an image corresponding to the target shape results from the dilations. A first image is then eroded by each of the small structuring elements in series with the resulting transformed image corresponding to the erosion of the first image by the target shape. This series of erosions can be implemented by iteratively routing the serial stream of digital data through a single neighborhood processing stage, while reprogramming the neighborhood processing stage with the next appropriate small structuring element prior to the next iteration, or by routing the serial stream of digital data through a chain of neighborhood processing stages with each stage programmed to perform an erosion operation corresponding to a particular preselected small structuring element.

BRIEF DESCRIPTION OF THE DRAWINGS

These and other objects and advantages of the present invention will become more apparent upon reading the following specification and by reference to the drawings in which.

DETAILED DESCRIPTION OF THE PREFERRED EMBODIMENT

Figure 1:
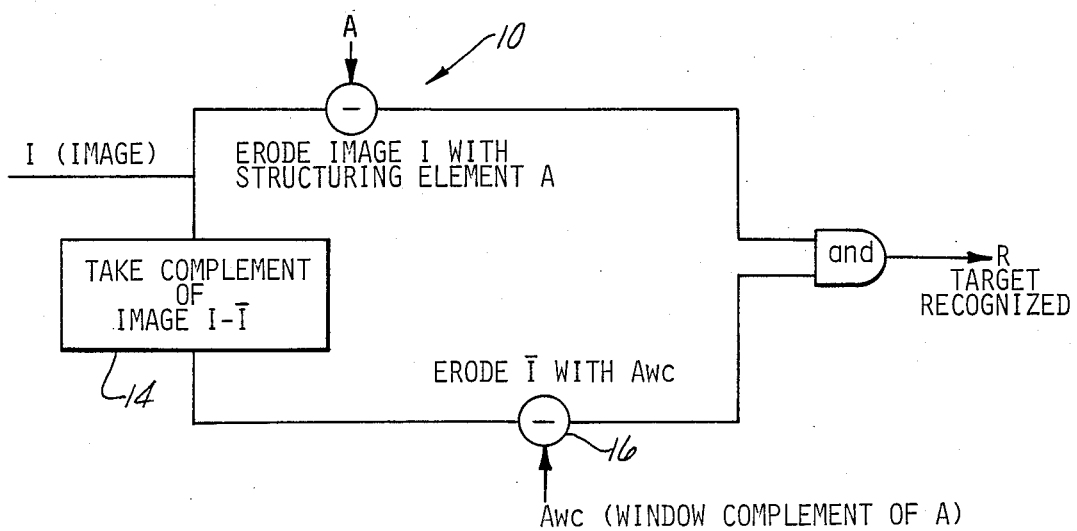
FIG. 1 is a block diagram of the method of the present invention.

An image analyzer system of the present invention, implementing the method illustrated in FIG. 1, is capable of detecting the existence and location of particular preselected shapes anywhere within an image represented by a matrix of digital data signals in a straightforward and efficient manner. The generalized method for automatic shape recognition, referred to as 10 may be implemented on a general or special purpose computer. Given an image I and a particular shape A, each represented by a matrix of digital data signals, or pixels, a system employing the method of the present invention can detect the existence and location of the shape A anywhere in the image I through a series of simple set operations and the image algebra operations of erosion and dilation. After storing the image I and the shape A in memory, the complement of the image Ī and the window complement $A_{wc}$ of the target shape are also created and stored in memory. In the case of binary images, that is images wherein the data signal values are either 0's or 1's, the complement of image I Ī is represented by a matrix of pixels wherein the pixels of the complement image have the value 0 at each corresponding location of the matrix of image I where pixels have the value 1 and vice versa. The window complement $A_{wc}$ of the shape A is represented as complement of shape A surrounded by a contrasting background. In the case of binary images, the window complement of the target shape $A_{wc}$ will be represented by a matrix having a group of pixels with the value 0 corresponding to the shape A surrounded by a frame of pixels having the value of 1. The image I is then eroded with the target shape A and the complement of the image Ī is eroded with the window complement of the target shape $A_{wc}$. A logical AND is then performed on a pixel-by-pixel basis on the corresponding pixels of the resulting images. This operation yields a result image R wherein each of the points on the image identifies the location of the center of shape A in the original image I.

It should be noted that, although the method of the present invention is illustrated in connection with the use of binary values images, gray scale or 3-dimensional images may be analyzed in the same manner by utilizing the umbra transforms of the gray scaled images.

Figure 2:
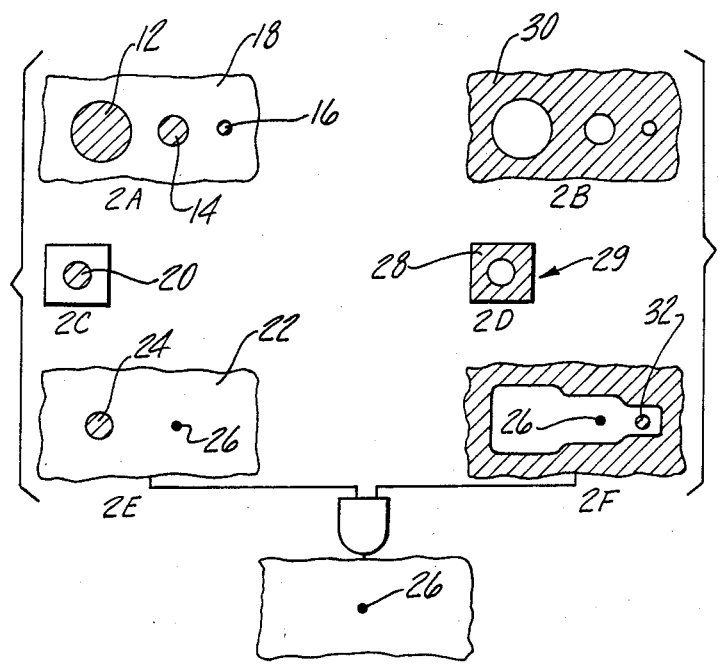
FIGS. 2(A-E) diagramatically illustrates an example of the shape recognition method of the present invention.

A simple example of the shape recognition method of the present invention is illustrated in FIGS. 2(A-E). FIG. 2A illustrates an image I having a plurality of objects 12-16 located on a background 18. Assuming this image is binary valued, the pixels in the matrix representing image I would have the value 0 at each background location and the value 1 at each location where objects 12-16 are found.

FIG. 2B shows the complement of the image Ī which represents the "background" of image I.

FIG. 2C shows the target shape A that is to be detected in the image I. As will be appreciated by those skilled in the art, the erosion of the matrix corresponding to the image I by the structuring element 20 corresponding to the target shape A yields a resulting matrix wherein each point of the matrix identifies a location where the shape A "fits inside of" one of the objects 12-16 in the image I. The first transformed image 22, shown in FIG. 2E, thus identifies a plurality of points 24 where the structuring element 20 may be located within object 12 in the image I, and a single point location 26 where the structuring element 20 may be located within object 14 in the image I. It should be noted that, while this erosion operation discriminates between the target shape A and object 16, it leaves a continuum of false alarms caused by the fact that there are a lot of places where target shape A will fit inside object 12. Assuming that we are looking for the exact shape A in the image I we must also test for the occurrence of the background for the shape A in the background of the image I. In the case of gray scale imagery, the background requirement corresponds to the notion that the shape appears in the image with adequate contrast.

To get at the background requirement, we introduce a window W which is a point set in the plane which contains the target shape A. In the present example, the window is a square slightly wider and taller than the shape A. Thus, the window complement of the target shape $A_{wc}$ is the complement of shape A within the defined window W.

Referring to FIGS. 2B and 2D, it will be appreciated by those skilled in the art that erosion of the complement of the image I by the window complement of the shape $A_{wc}$ will yield a set of points signifying those locations where the background 28 surrounding the shape A "fits within" the background 30 in the image I. The result of this erosion operation is shown in FIG. 2F. It should be noted that the set contains a single point 26 at which the window complement of the shape A "fits within" the complement of the image I, and a group of several points 32 which also satisfy this criteria. A logical AND is now performed on the corresponding points in the images shown in FIGS. 2E and 2F. The result image of this logical AND contains a single point 26. It will be appreciated by those skilled in the art this single point represents the point at which the shape A occurs in the image I and the background surrounding the shape A occurs in the background of the image I. Thus, the method of the present invention provides a simple, generalized approach to detecting the occurrence of preselected shapes anywhere in any images.

It will also be appreciated by those skilled in the art that imperfect shapes may be detected by the method of the present invention by employing a somewhat skinny version of the exact shape as the target shape A and a somewhat enlarged version of the complement of A in the window complement of the target shape $A_{wc}$.

Figure 3:
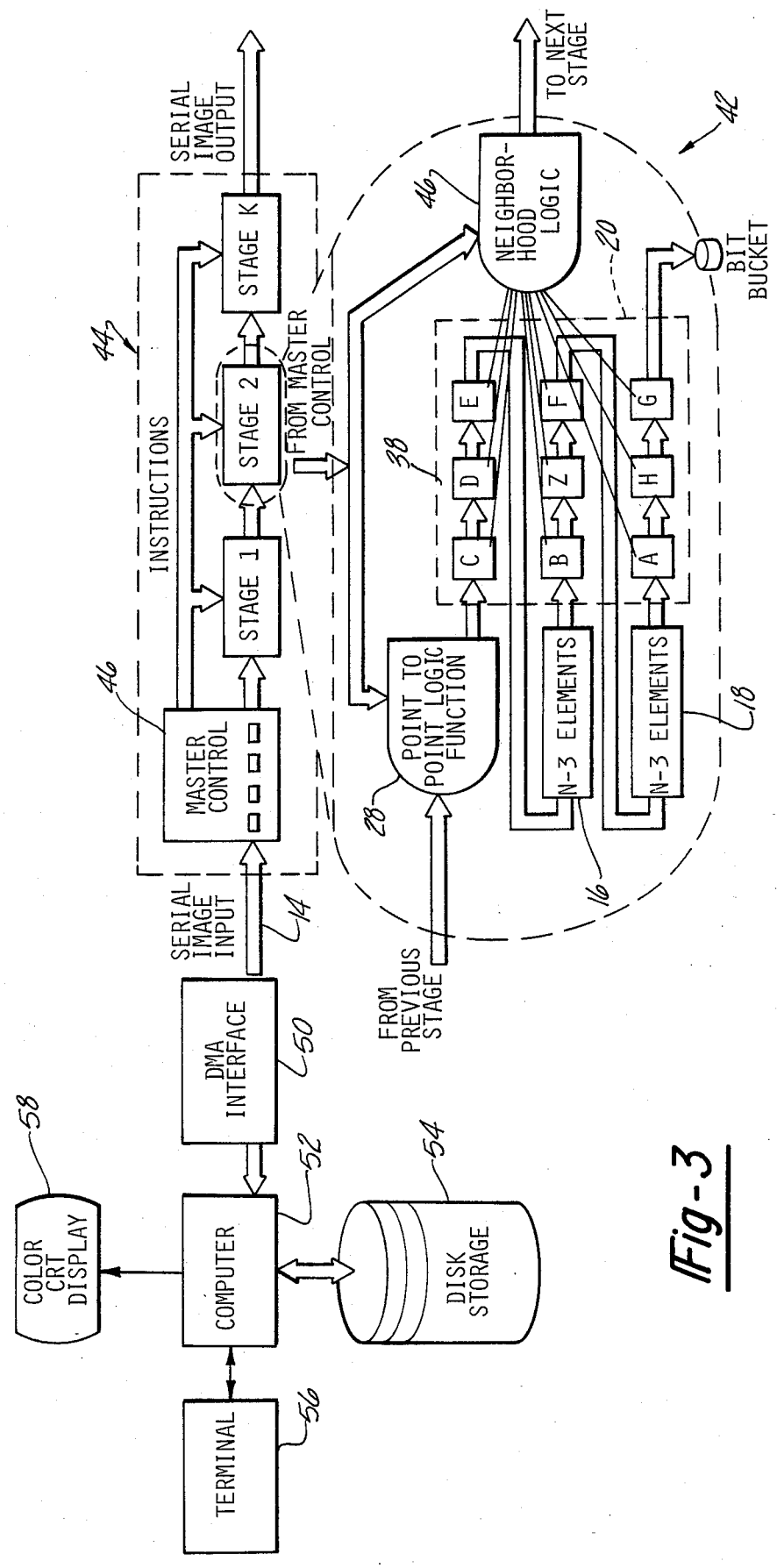
FIG. 3 is a block diagram of a neighborhood transform stage utilized in the preferred implementation of the method of the present invention.

In the preferred embodiment, many of the steps, including the electronic eroding of the image I and the complement of the image Ī by the structuring element 20 corresponding to the target shape A and the structuring element 29 corresponding to its window complement $A_{wc}$ respectively, are implemented on a special purpose computer 44 comprising one or more substantially identical, programmable neighborhoood transformation stages 42. Each of these programmable neighborhood transformation stages 42 (shown in FIG. 3) is adapted to operate on a serial stream of digital electrical signals corresponding to the matrix of pixels representing an image. Additional stages may be linked together in a serial chain so that the output of one stage provides the input to the next. Each of the stages in the chain receives program data and control signals from a master controller 46 and may be programmed to perform a different neighborhood transformation on the pixel data. Thus, the serial stream of pixel data corresponding to a single image may be routed through a chain of stages 42 and undergo a series of different transformations during one cycle. The neighborhood processing stages 42 utilized in the preferred embodiment are disclosed in greater detail in U.S. Pat. No. 4,414,685, issued to Sternberg and assigned to the Environmental Research Institute of Michigan, the assignee of the present invention, which is incorporated herein.

Each of the neighborhood processing stages utilizes nine serially connected latches 38 which allow access to each pixel as the center pixel Z, and its eight nearest neighbors A-H as the pixel data is serially shifted through the transformation stage. The pixel values corresponding to the eight neighbors A-H of the current center pixel may then be combined to form an 8-bit vector which is used as an address to interrogate the corresponding locations in a neighborhood random access memory (NRAM) look-up table located in the neighborhood logic 46. As will be appreciated by those skilled in the art, the neighborhood logic 46 may be suitably programmed to accomplish the erosion of an image by a 3×3 structuring element.

The pipeline of neighborhood processing stages 44 is connected, through a direct memory access interface 50 to a suitably programmed general purpose computer 52 and a variety of peripherals for performing the remaining functions required in the practice of the present invention. The general purpose computer 52 may be programmed to perform the multiple image combining operations and is connected to a conventional disk storage device of sufficient size to accomodate all of the image data utilized. A terminal 56 and CRT display 58 are likewise connected to the general purpose computer 52 to allow for programmer interface.

Since the target shape A and its window complement $A_{wc}$ may be larger in size than the 3×3 neighborhood accessed by each neighborhood transformation stage 42, a series of sequential erosions, utilizing a number of small structuring elements, must be performed in order to erode an image by the larger structuring element corresponding to the target shape A.

Figure 4:
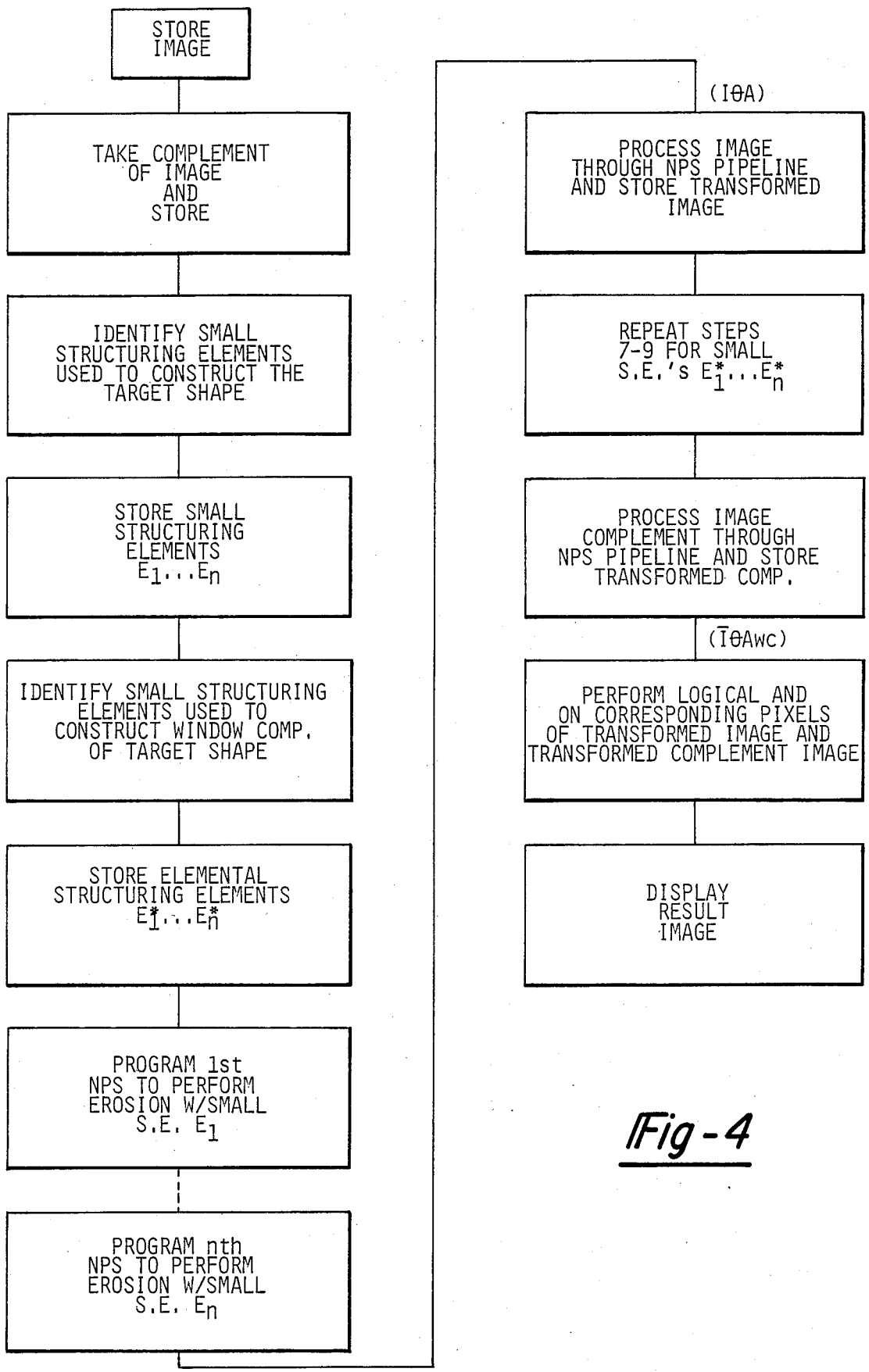
FIG. 4 is a block diagram detailing the steps necessary to implement the method of the present invention on a Cytocomputer.

Referring to FIG. 4, the steps for accomplishing the method of the present invention by utilizing a series of neighborhood processing stages begins with identifying the small structuring elements. A series of dilation transformations, utilizing one or more 3×3 structuring elements is performed in order to construct the target shape A and its window complement $A_{wc}$. Dilation is effectively a geometric addition. It can be envisioned as the process of creating a particular pattern in a given matrix by superimposing the center point of the structuring element over each data point containing a specified value in the matrix. The operations of dilation and erosion, performed in connection with the apparatus utilized in the preferred embodiment of the present invention, is disclosed in greater detail in U.S. Pat. No. 4,414,685. The complement of the image $\bar{I}$ is computed and is stored in memory for later use. It should be noted that methods for taking the complement of images represented by a matrix of pixels can be performed on general purpose computers by utilizing techniques generally known in the art. Once the target shape element A and its window complement $A_{wc}$ have been created by a series of dilation transformations utilizing small structuring elements, these small structuring elements are stored in memory for later use.

After the image I, the complement of the image $\bar{I}$, the small structuring elements $e_1 \ldots e_n$ used to construct the target shape A, and the small structuring elements $e^*_1 \ldots e^*_n$ utilized to construct the window complement $A_{wc}$ of the target shape A have been identified and stored, electronic erosion steps may be performed in the neighborhood processing stages. The first stage in the chain is programmed to perform an erosion with small structuring element $e_1$, the second stage is programmed to perform an erosion with elemental structuring element $e_2$ and so forth with the last neighborhood processing image in the chain programmed to perform erosion with elemental structuring element $e_n$. The image I is then input to the pipeline of neighborhood processing stages and the output of the last processing stage is stored. As will be appreciated by those skilled in the art, this output image represents the image I eroded by the larger structuring element corresponding to the target shape A. As will also be appreciated by those skilled in the art, a single neighborhood processing stage may be utilized to form the above steps by performing a number of iterations corresponding to the number of elemental structuring elements $e_1 \ldots e_n$, and reprogramming the single stage for each different structuring element prior to the next iteration.

Each of the neighborhood processing stages in the chain is then reprogrammed in the above-described manner to perform erosions of the complement of the image $\bar{I}$ with each of the small structuring elements $e^*_1 \ldots e^*_n$ used to construct the window complement of the target shape $A_{wc}$. This second resulting output, representing the complement of the image $\bar{I}$ eroded by the window complement of the target shape $A_{wc}$ is then stored in image memory. Each of the first and second resulting images, representing the image I eroded by the target shape A and the complement of the image $\bar{I}$ eroded by the window complement of the target shape $A_{wc}$ are then combined to produce the third result image. This operation is accomplished by performing a logical AND on corresponding pixels of each of the first and second result images. This operation may be performed on a general purpose computer by utilizing conventional methods of logical and arithmetic data array processing. The output of this operation is an image which contains only those points corresponding to locations which contain both the target shape A and the background surrounding the target shape A.

We claim:

1. A machine implementable method for detecting shapes in a first image represented by a matrix of digital data signals including the following steps:
    (a) storing the first image matrix;
    (b) computing the complement of the first image matrix and storing the complement image matrix;
    (c) creating a first structuring element representative of the shape to be recognized, the first structuring element being represented by a matrix of digital data signals slightly larger in dimension than the shape;

(d) creating a second structuring element equal to the window complement of the first structuring element;

(e) electronically eroding the first image matrix with the first structuring element to form a first transformation matrix;

(f) storing the first transformation matrix;

(g) electronically eroding the complement image matrix with the second structuring element to form a second transformation matrix;

(h) storing the second transformation matrix; and (i) combining the corresponding points of the first and second transformation matrices to form a result matrix wherein each non-zero point represents the location of the desired shape in the first image.

2. The method of claim 1 wherein the corresponding points of the first and second transformation matrices are combined in step (i) by performing a logical AND on the corresponding points.

3. The method of claim 1 wherein creating the first structuring element includes the steps of:

forming said structuring element by a series of dilation steps using smaller structuring elements to form a structuring element of the particular configuration; and storing the smaller structuring elements.

4. The method of claim 3 wherein electronic erosion steps of (e) and (g) are each carried out by performing one or more iterations of routing the image data through a neighborhood transformation stage, with each iteration eroding the digital data signals of the first image matrix with one of the stored smaller structuring elements.

5. The method of claim 3 wherein electronic erosion of steps (e) and (g) is carried out by routing the digital image data through a chain of substantially identical neighborhood transformation stages, with each stage eroding the digital data signal with one of the stored smaller structuring elements.

* * * * *